United States Patent
Dieterich et al.

[15] 3,652,924

[45] Mar. 28, 1972

[54] ARRANGEMENT FOR CONTROLLING THE CURRENT OF AN AT LEAST TWO-PHASE LOAD WITH CONSTANT FREQUENCY SUPPLY VOLTAGE

[72] Inventors: Manfred Dieterich, Stuttgart-Zuffenhausen; Gunter Schirmer, Leinfelden; Gerhard Conzelmann, Leinfelden-Unteraichen; Walter Harlin, Stuttgart-Kaltental; Gerhard Haustein, Leinfelden-Unteraichen; Wilhelm Ocker, Bonlanden, all of Germany

[73] Assignee: Robert Bosch GmbH, Stuttgart, Germany

[22] Filed: Feb. 20, 1970

[21] Appl. No.: 13,135

[30] Foreign Application Priority Data

Feb. 21, 1969 Germany......................P 19 08 726.4

[52] U.S. Cl....................................323/24, 318/227, 323/34
[51] Int. Cl............................................................G05f 1/56
[58] Field of Search................318/227, 230, 231; 323/22 SC, 323/24, 34

[56] References Cited

UNITED STATES PATENTS

| | | |
|---|---|---|
| 3,348,110 | 10/1967 | Koppelmann............................318/227 |
| 3,443,184 | 5/1969 | Lemmrich...............................318/227 |
| 3,443,185 | 5/1969 | Sowa......................................318/227 |
| 3,522,502 | 8/1970 | Tuchen..............................318/227 X |

*Primary Examiner*—A. D. Pellinen
*Attorney*—Michael S. Striker

[57] ABSTRACT

An arrangement for the operation of a polyphase load from an alternating current source through the control of triacs. One triac is connected in each phase of the source connected to the load. The control electrodes of the triacs are controlled through a primary stage having a variable time delay in the form of a monostable multivibrator with RC network of variable resistance. A synchronizing device is connected between the primary stage and one phase of the alternating current source. Secondary control stages with fixed time delay elements receive signals from the primary stage or from other secondary stages to control the firing of the triacs. The firing pulses are generated through resetting of the monostable multivibrators present as the time delay elements in the control stages.

17 Claims, 11 Drawing Figures

INVENTORS
Walter HÄRLIN
Gerhard HAUSTEIN
Wilhelm OCKER
Manfred DIETERICH
Günter SCHIRMER
Gerhard CONZELMANN
By their ATTORNEY INVENTORS
Walter HÄRLIN
Gerhard HAUSTEIN
Wilhelm OCKER
Manfred DIETERICH
Günter SCHIRMER
Gerhard CONZELMANN
By their ATTORNEY

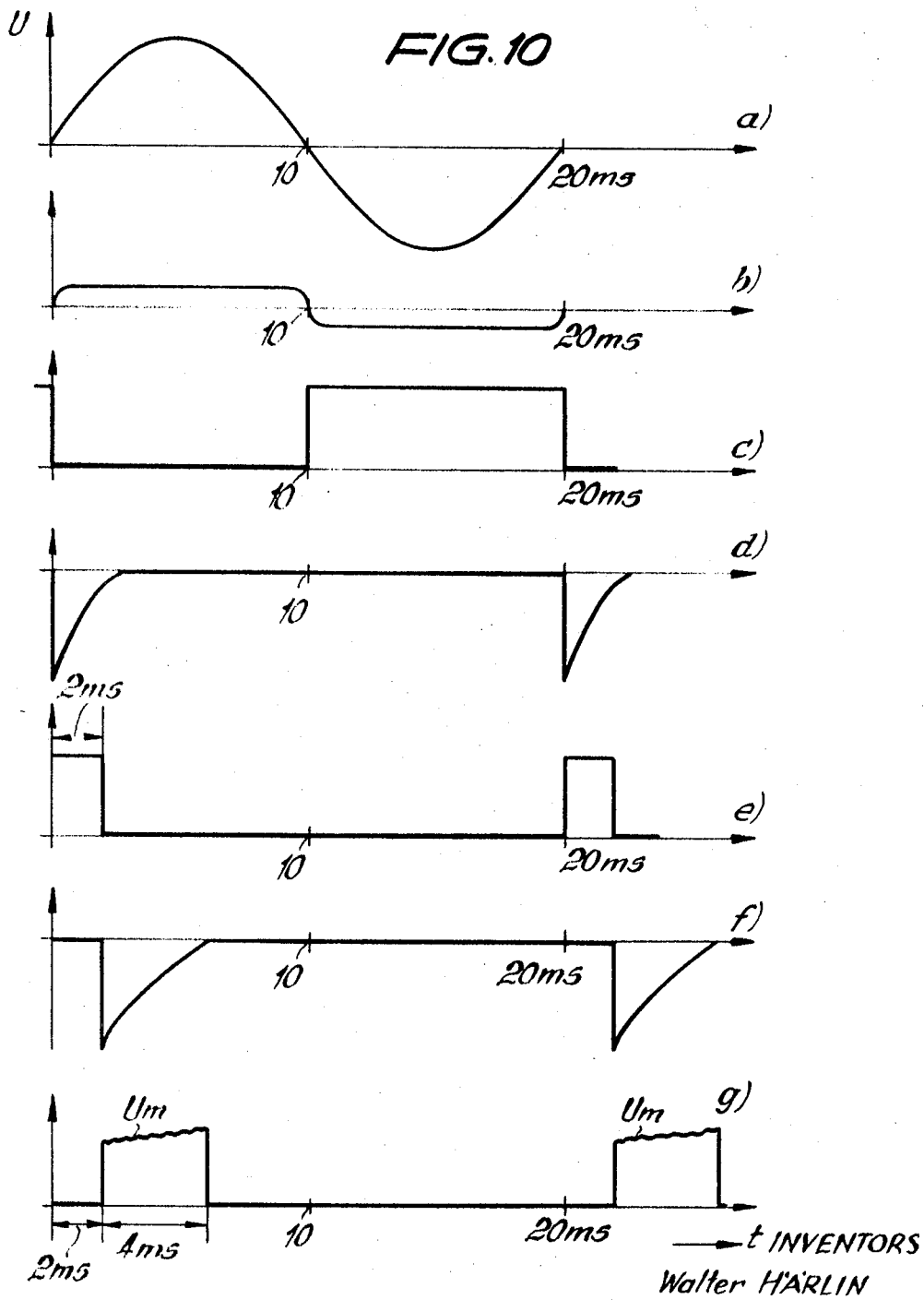

ARRANGEMENT FOR CONTROLLING THE CURRENT OF AN AT LEAST TWO-PHASE LOAD WITH CONSTANT FREQUENCY SUPPLY VOLTAGE

BACKGROUND OF THE INVENTION

The present invention relates to an arrangement for driving controllable semi-conductor switches in two flow directions. Such semi-conductor switches are, in particular, bidirectional elements in the form of triacs. These triacs or semi-conductor switches are connected to the phases of an alternating current system supplying a load. Control devices are connected to the control electrodes of the semi-conductor switches. In power control and for other regulating purposes, such control semi-conductor switches have shown themselves to be particularly applicable and advantageous. They operate rapidly and reliably. With the controllable semi-conductor switches, so-called phase control is realized, whereby the semi-conductor switches are only conducting during a portion of a voltage half-wave from a power supply network. The central or neutral conductor applied to a load, results then from the currents and voltages during the conductive time interval of the semi-conductor switches. Through the use of bidirectional thyristor elements such as triacs, it is particularly simple to control a connected alternating current load. Thus, for example, it is particularly simple to control the operation of an alternating current asynchronous machine. A bidirectional element is similar to two simple thyristors connected in parallel and in opposite directions. A triac, however, differs from this arrangement in that it is controllable in both current flow directions through properly polarized firing pulses.

The control devices used conventionally for thyristors provide the function of the phase voltage of the power supply network, corresponding to the firing pulse. The phase relationship of the firing pulse is thereby established through transformers which have a winding for each phase of the supply network. When such control devices are inserted into the regulating circuits, as for example, in regulating circuits for driving electrical machines, it is known in the art to obtain the operating state of the machine through an indicating output value, with the aid of tacho generators or devices. Such output value indicating the actual operating state of the machine is then compared with a predetermined input value or desired value through means of a regulator. The regulator operates in accordance with the deviation between the output and input values, upon a phase shift of the phase voltage of the network through the firing instant of the controllable semi-conductor.

It is the object of the present invention to simplify the control or driving of bidirectional elements, and thereby to provide for regulation of electrical machines in a simple manner.

The solutions to the object of the present invention resides in an arrangement which uses a time delay element within a primary or fundamental stage that serves as a first control unit. The time delay element has an adjustable or variable time delay, and is connected with a phase of the power supply network through a synchronizing arrangement. The further control devices include time delay elements which have constant time delays, and to which switching pulses are applied from the primary stage or one of the time delay elements. The solution to the problem resides, furthermore, in an arrangement of the aforementioned character, in which the semi-conductor switches are setting elements of a regulating circuit in which the regulating path is formed through electrical machines. The arrangement includes a regulator which has applied to it an input value or a desired value, as well as the output value corresponding to the operational state of the electrical machine. A sampling stage for the output value or output parameter is provided with one control input and a sampling input. This sampling stage has delay elements through which an output value is applied to the regulator from the induced voltage of the electrical machine when this induced voltage exceeds a predetermined value within the blocking or turned off region of the semi-conductor switches, at the load side of these switches. The control input of the sampling stage can be directly connected with a phase of the power supply network, through a voltage divider. At the same time, the control input of the sampling stage can be connected to the output of a current transformer which is arranged in the line between the semi-conductor switches from which the output value is sampled, and the power supply network. It has shown itself to be technically advantageous to sample an output value only during a half-wave of the voltage of the supply network. This can be achieved in a particularly simple manner, when a diode is arranged in parallel with the control input of the sampling stage. An advantageous arrangement is realized with the control devices using time delay elements, when these time delay elements are in the form of monostable multivibrators. A monostable multivibrator can then be used as the fundamental of primary stage with variable delay.

An advantage of the arrangement, in accordance with the present invention, resides in the simple manner in which the firing pulses are realized through semi-conductor elements, and are then applied to monostable multivibrator circuits to reproduce the polyphase system. A very substantial advantage is realized compared to the use of tacho generators, for example, by employing the sampling stage for the actual or output value in accordance with the present invention. The induced voltage at the semi-conductor switches during a phase cut-off, at the load side, is, for example, proportional to the armature back EMF or voltage in an alternating current asynchronous machine. The magnitude of such induced voltage is characteristic of the operating state of the machine. The omission of tacho generators or tachometers or similar arrangements for obtaining the actual or output value, simplifies considerably such a regulating circuit. Aside from this, it is possible to connect arrangements or loads for extremely heavy operation, since the tachometer or tacho generator with its mechanical complexity and possible error source is omitted. The sampling stage in accordance with the present invention, is also usable for operation in conjunction with control devices containing monostable multivibrators. The time interval of the primary stage may be varied in a particularly simple manner.

SUMMARY OF THE INVENTION

An arrangement in which triacs are connected between the output phases of a polyphase alternating current source and a corresponding load. The triacs are controlled from a controlled stage in the form of a primary stage having a time delay of variable magnitude. A synchronizing device is connected between the primary control stage and one of the phases of the alternating source. Secondary control stages with fixed time delays receive signals from the primary stage. The time delays are achieved through monostable multivibrator circuits, the variable time delay being established through an RC network with variable resistance in the form of a transistor. Firing pulses are generated upon the resetting of the monostable multivibrator. When the load is in the form of an asynchronous machine, a sampler is connected between the source and the machine and across a triac. The output of the sampler provides the output parameter which is applied to a regulator unit having also an input parameter inserted to it. The regulator supplies a signal to the primary control stage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 5a and 5b and 10 are voltage and current diagrams as a function of time for the operation of an asynchronous machine with different firing angles or instants of the arrangement of the present invention.

DESCRIPTION OF THE PREFERRED EMBODIMENTS

Figure 1:
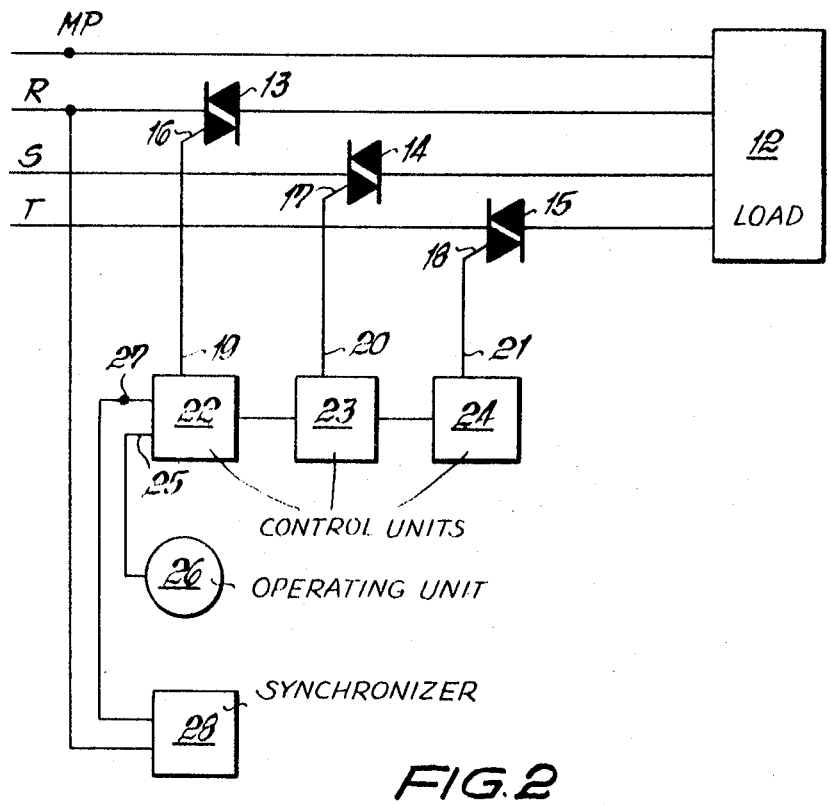
FIG. 1 is a block diagram of the control arrangement for controlling the operation of a load from a power supply network in the form of a polyphase system, in accordance with the present invention.

Referring to the drawing, and in particular to FIG. 1, the three phases of an alternating current supply network are denoted by R,S and T, whereas neutral or central conductor line is denoted by the symbol MP. A triac 13 is connected between the phase R and the load 12. Similarly, triacs 14 and 15 are connected between the phases S and T, and the load 12, respectively. The triacs 13 to 15 have control electrodes 16 to 18 which lead to the outputs 19 to 21, respectively, of the control units 22 to 24. The control unit 22 serves as the basic stage, and is connected, with one input 25, to operating element 26. A second input 27 of the control unit 22, is connected to a synchronizer 28 which, in turn, is connected to the phase R. The control unit 24 is connected with the control unit 23, whereas the latter is connected to the basic stage or first stage 22.

Figure 2:
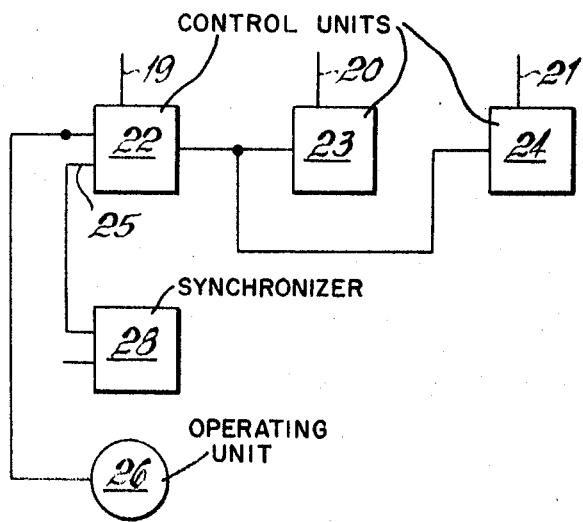
FIG. 2 is a block diagram representing another embodiment of the arrangement of FIG. 1.

The only difference between the embodiment shown in FIG. 2 and the embodiment shown in FIG. 1, resides in the feature that the control unit 23 and the unit 24 are not interconnected with each other, as shown in FIG. 1. Instead, in FIG. 2, both of these control units 23 and 24 are connected to the basic or first stage 22.

In operation of the arrangements of FIG. 1 and FIG. 2, an operating pulse is applied by the synchronizer 28 to the input 27 of the basic or primary stage 22, within a predetermined time interval of the phase voltage of phase R. After the expiration of a delay time interval associated with the primary stage 22, a triggering pulse is applied to the control electrode 16 of the triac 13 from the output 19 of this primary stage 22. As a result of this application of the triggering pulse to the control electrode 16, the triac 13 becomes conducting till the current passes through zero in phase R. An actuating or operating pulse is, furthermore, applied to the control unit 23 simultaneously with the preceding trigger pulse. After the expiration of the time delay associated with the control unit 23, a triggering pulse appears at its output 20, and is applied to the control electrodes 17 of the triac 14. At the same time that the trigger pulse appears at the output 20, the control unit 24 receives also an actuating or operating pulse from the control unit 23. In a similar manner, a triggering pulse appears at the output 21 of the control unit 24, after the expiration of the time delay associated with this unit. The triggering pulse appearing at the output 21 is applied to the control electrode 18 of the triac 15.

Through the time delay elements which are controlled in sequence within the control units, the alternating current system of the power supply is reproduced. The delay time interval of the primary or basic stage 22 is made adjustable through the operating unit 26 which feeds into the control unit 22 through the input 25 thereof. When, for example, the delay time interval of the primary or basic stage 22 is substantially small, the triac 13 associated with the phase R becomes earlier triggered or fired. As a result, the triacs 14 and 15 also become earlier triggered. When, on the other hand, the delay time interval of the primary stage 22 is large, the triac 13 becomes triggered substantially later as, for example, shortly before the current in the phase R reaches zero. The triac 13, thereby, becomes turned off a short time thereafter. The triacs 14 and 15 then become triggered or switched on after a time interval corresponding to the shift in the three-phase current.

In a first case that may be considered, the load 12 can receive a large amount of power from the network, whereas it receives only a substantially small amount of power in a second case. The control units 23 and 24 of FIG. 1 have each identical time delays which correspond to the phase shift between each of two phases of the alternating current supply. The time delay of the control unit 23 and the control unit 24 corresponds, thereby, to 60 electrical degrees. When, as shown in FIG. 2, the control units 23 and 24 are simultaneously switched on by the primary stage 22, the time delay associated with the control unit 23 corresponds to an angle of 60 electrical degrees, whereas the time delay associated with the control unit 24 corresponds to an angle of 120 electrical degrees. As a result of this arrangement, the alternating current supply is reproduced at the outputs 19,20 and 21.

Figure 3:
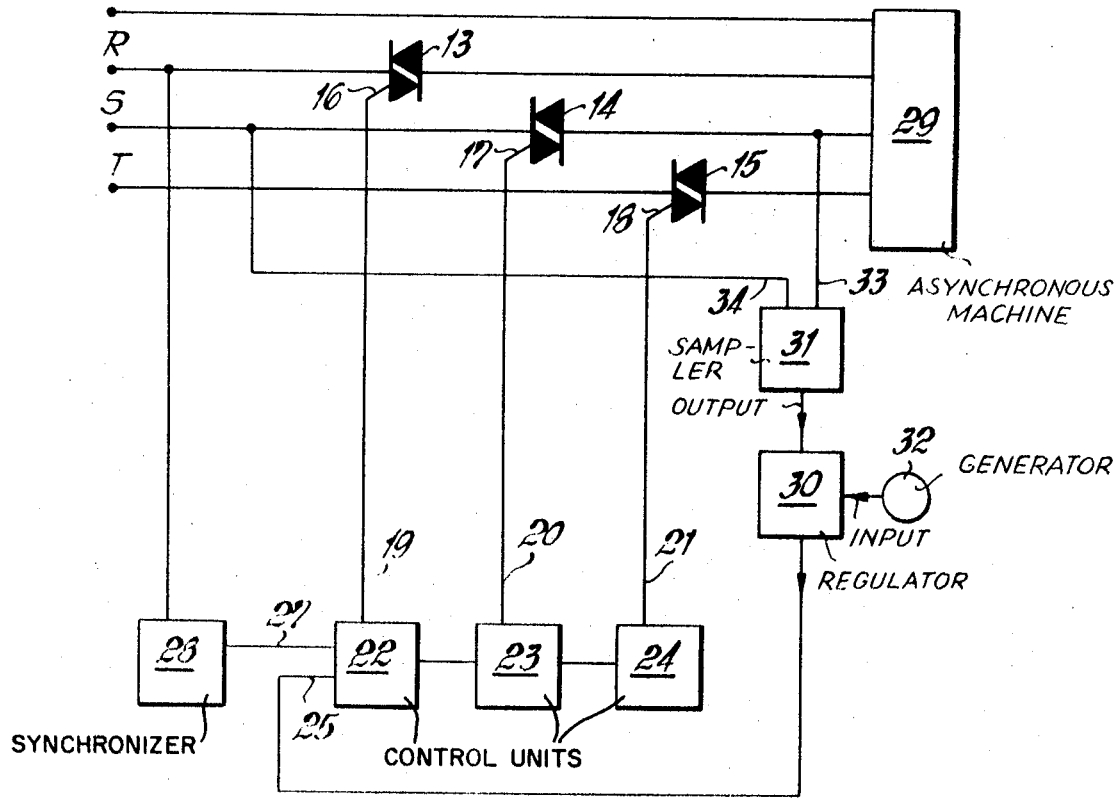
FIG. 3 is a block diagram of a regulating circuit for regulating the operation of an asynchronous machine connected to a polyphase alternating current system, in accordance with the present invention.

In the embodiment of FIG. 3, an asynchronous machine 29 operates in conjunction with the control units described in relation to FIG. 1. A set parameter is applied to the input 25 of the primary stage 22, from the output of a regulator 30. A desired input value generator 32 applies a desired value to the regulator 30. The sampling stage 31, on the other hand, applies to the regulator 30 the actual prevailing output. The sampling stage 31 has a sampling input 33 and a control input 34. The sampling input 33 is connected between the phase S associated with the triac 14, and the asynchronous machine 29. The control input of the sampler 31, on the other hand, is connected with the phase S of the alternating current system of the power supply network. Thus, the input 33 is connected between the triac 14 and the machine 29, whereas the input 34 is connected between the triac 14 and the phase S.

Figure 5A:
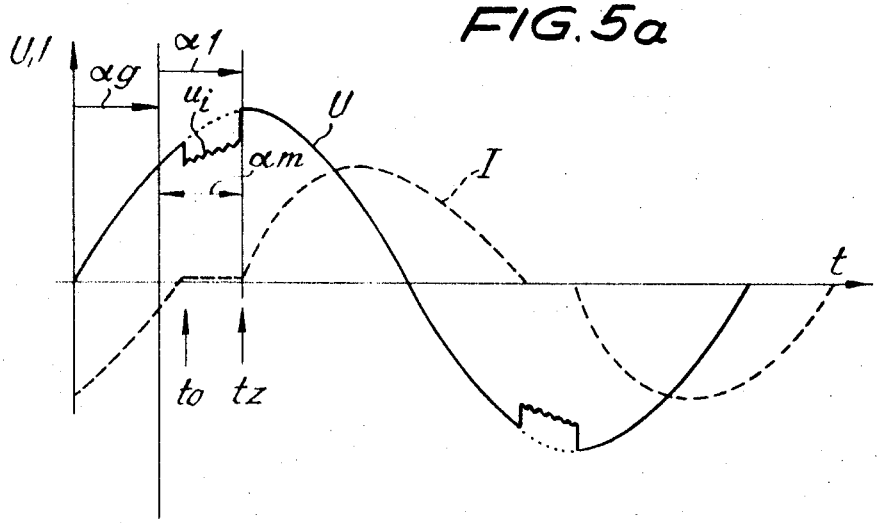
Figure 5B:
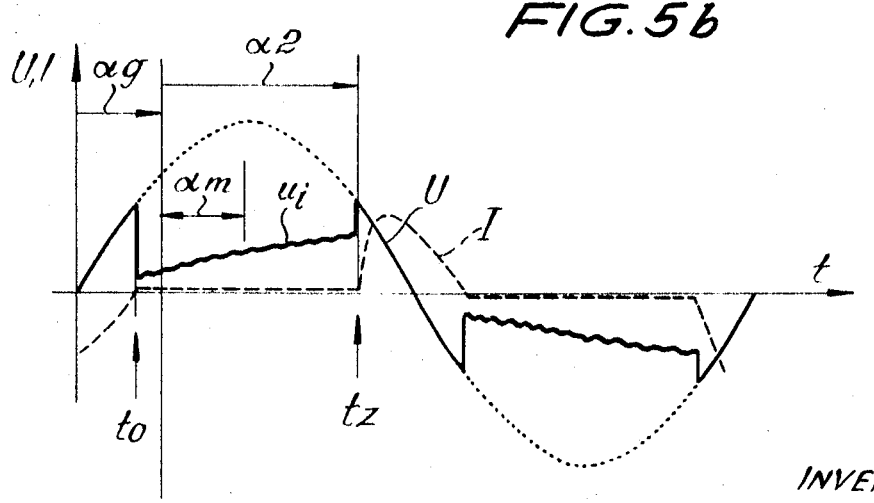

The functional operation of the embodiment of FIG. 3 may be clarified through the current and voltage diagrams illustrated in FIGS. 5a and 5b. The voltage of the phase S of the supply network, is designated by the curve U. Within the time interval $t_0$ and $t_z$, the curve U does not follow a smooth function, and is instead, denoted by a dotted line within this time interval. The current I flowing through the triac 14, is denoted by a dashed line. The current I ceases at the instant of time $t_0$, whereas the triac 14 again conducts after the time instant $t_z$. Since an asynchronous machine has a severe inductive characteristic, particularly when in the idling or unloaded state, a significant phase shift prevails between current and voltage. Within the time interval denoted by the instants $t_0$ and $t_z$, the triac 14 is cut-off, and at the load side of this triac, the voltage $U_i$ prevails. This voltage $U_i$ corresponds to the induced armature voltage of the asynchronous machine 29.

A measuring region $\alpha_m$ lies within the cut-off interval of the triac 14 and begins after the expiration of a time delay corresponding to the angle $\alpha_g$ beginning at the instant when the voltage passes through zero. During this measuring interval $\alpha_m$, the voltage appearing between the triac 14 and the load 29, is applied to the sampler or sampling stage 31 of the regulator 30. In the diagram of FIG. 5a, the angle between the time instants $t_0$ and $t_z$, is small, and the triac 14 is fired or triggered through the control unit 23 after a time interval terminating at $t_z$. This time interval terminating at $t_z$ corresponds to an angle of $\alpha_g + \alpha_1$ and the instant $t_z$ corresponds to the instant after the phase voltage has passed through zero. The interval $\alpha_g$ is, thereby, a basic time delay which is firmly set and cannot be exceeded. It serves the purpose of preventing the firing of the triac prematurely and before the current has become zero, in extreme cases.

If, for example, the firing of the triac occurs at an instant at which the current has not yet become quite zero, then the triac becomes turned off through the subsequent zero passage and remains thereby cut-off through the entire subsequent half-wave. The measuring region $\alpha_m$ connects to the fundamental or basic delay $\alpha_g$, in the example under consideration. The end or termination of the fundamental delay $\alpha_g$ and the beginning of the measuring region $\alpha_m$ need not be identical. The fundamental or basic delay $\alpha_g$ becomes determined through the basic or primary stage 22, whereas the beginning of the measuring region is determined by the sampling stage 31. Only in the worst case in which the ignition or firing angle is minimum and the phase shift is maximum between current and voltage, is it possible that the measuring region $\alpha_m$ does not fully cover the cut-off region of the triac. Such an error which may act as a disturbing factor is, however, compensated. In the case in which the measuring region is extensively covered by the operating voltage, the entire network supply voltage lies or prevails at the load in any event.

In the diagram of FIG. 5b, the voltage U and current I are shown in relation to a substantially larger firing angle. The measuring region $\alpha_m$ is again determined through the fundamental delay $\alpha_g$. The triac receives a firing pulse after a time interval corresponding to the summation of the angles $\alpha_g + \alpha_2$. This total angle $\alpha_g + \alpha_2$ terminates at the instant $tz$. The triac was cut-off to the instant to, since the current passed through zero. The induced armature voltage is again designated again by $Ui$ within the cut-off region of the triac. Under this operating condition, the triac can conduct substantially smaller power from the supply network, then that derived from the product of the applied voltage to the asynchronous machine and the current. The time intervals corresponding to the angles $\alpha_g$ and $\alpha_m$, are determined by the delay elements within the sampling stage 31. The sampling stage 31 is connected with the phase S through the control input 34, and the beginning of the time intervals corresponding to $\alpha_g$ and $\alpha_m$ can, thereby, be established. A regulating signal or error signal is applied to the regulator 30, which is derived from the input and output parameters applied to the unit 30 by the generator 32 and sampling stage 31. From the regulating parameter applied to the input 25 of the primary stage 22, the delay interval of that stage may be extended or shortened. As a result, a very rapid shifting of the firing instant or point of the triacs 13 to 15, can be realized. The regulation functions very precisely even when the sampling stage 31 is only connected in front and behind a triac as, for example, the triac 14.

The use of the sampling stage for sampling the actual prevailing parameter, is not limited to the use of monostable multivibrator circuits within the control units. When, for example, an asynchronous machine is to be selectively connected to two networks of different frequencies, then either the delay times within the control units 22 to 24 must be adjustable in accordance with the frequencies, or control units of the conventional design can be used in conjunction with the sampling stage 31 and a corresponding regulator, in accordance with the present invention.

In the embodiments of FIGS. 4 and 6 to FIG. 9, the detailed circuitry is provided for the arrangement of FIG. 3.

Figure 4:
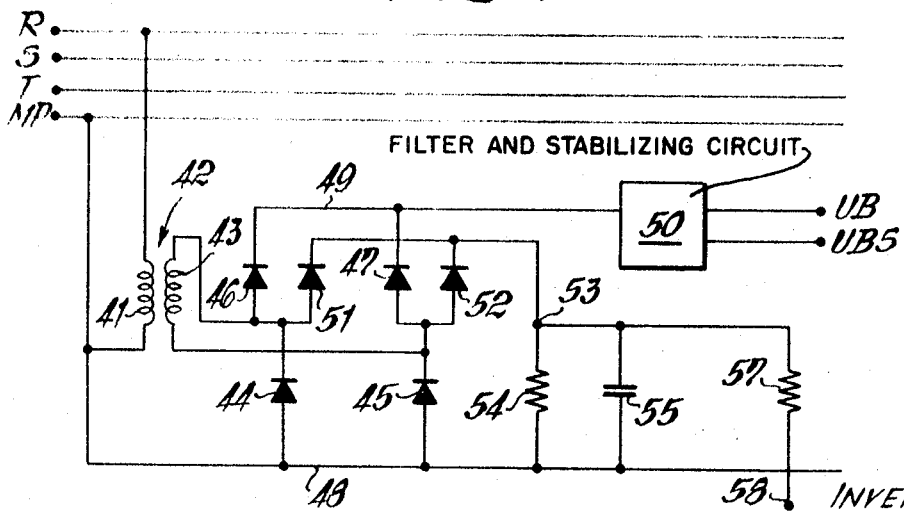
FIGS. 4 and 6 to 9 are circuit diagrams showing the component details of an embodiment of the present invention.

The circuit shown in FIG. 4, serves to produce two power supply voltages UB and UBS. This circuit, furthermore, serves to synchronize the associated parts or elements. The three phases of the alternating current supply networks are denoted by R,S and T, and the central or neutral conductor is denoted by MP. The primary winding 41 of a transformer 42 is connected between the phase R and the central conductor MP. The secondary winding of this transformer is denoted by the reference numeral 43. The diodes 44, 45, 46 and 47 form a full-wave rectifier, and the terminals of the secondary windings 43 are connected between the diodes 44 and 46, as well as the diodes 45 and 47. The anodes of the diodes 44 and 45 are connected together and to a line 48 which is of negative potential and which is connected with the line MP of the alternating current supply network. The cathodes of the diodes 46 and 47 are connected together and to a line 49 which conducts a positive potential. A filter and stabilizing circuit 50 is connected to the line 49, and has two outputs. The filtered DC voltage UB appears at one of the outputs of the circuit 50, whereas the stabilized DC voltage UBS may be taken from the other output of this circuit 50. The cathode of the diode 44, furthermore, is connected to the anode of a diode 51, whereas the cathode of the diode 45 is connected to the anode of a diode 52. The cathodes of the diodes 51 and 52 are coupled together and connected to a circuit junction 53 which leads to the line 48, through a resistor 54. Connected in parallel with the resistor 54, is a capacitor 55. A resistor 57, furthermore, has one terminal connected to the circuit junction 53, and another terminal to the connector 58.

In operation of the circuit of FIG. 4, the power supply voltages UB and UBS are produced from the diodes 45, 44, 46 and 47, as well as the filter arrangement 50. These supply voltages UB and UBS are used to energize and supply a circuit arrangement to be described. The diodes 44, 45, 51 and 52 also form a full-wave rectifier. Connected to this full-wave rectifier, is a filter circuit comprised of the resistor 54 as well as the capacitor 55 which form a parallel circuit between the circuit junction 53 and the circuit line 48. This filter arrangement or filter circuit does not respond to the fundamental wave of the rectified alternating voltage, but instead it responds only to higher harmonics. Through this arrangement, disturbances resulting from pulses initiated through the harmonics are avoided. Such disturbing effects influence the firing instants of the triacs. The DC rectified voltage appearing across the resistor 57 and derived from the circuit junction 53, is an alternating voltage in which the negative half-wave is flapped over about the time axis. This voltage is used for generating a starting pulse for a threshold voltage amplifier in conjunction with a primary stage to be described below.

Figure 6:
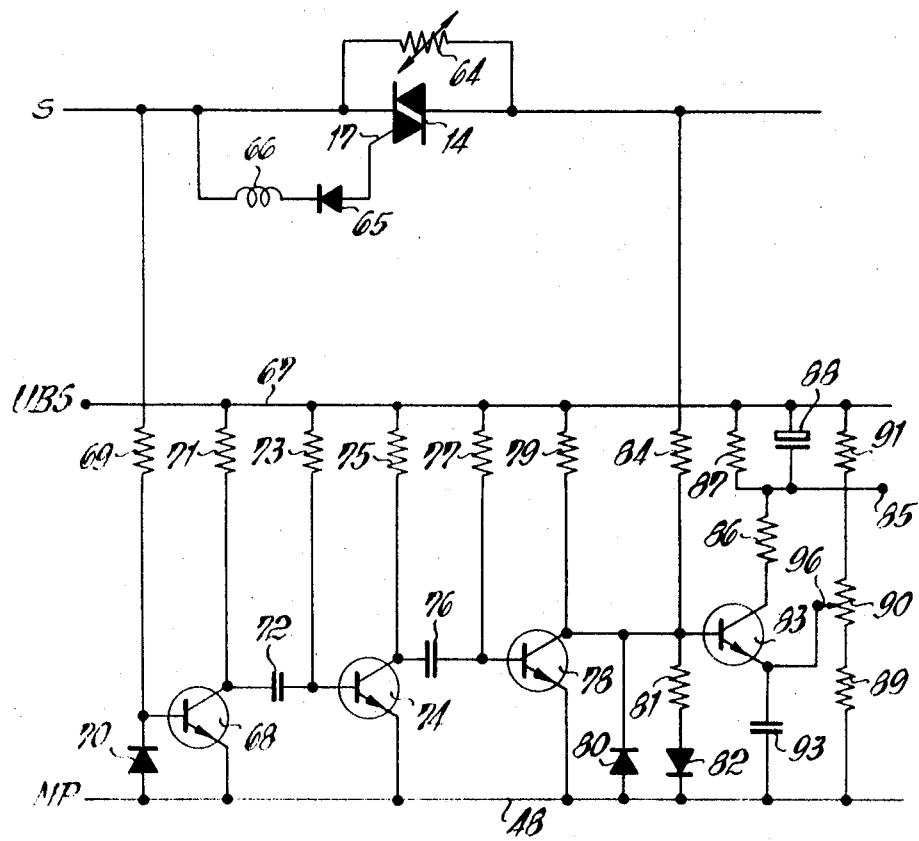

FIG. 6 shows the circuit arrangement of an embodiment for the sampling stage. In this circuit arrangement, only the phase S with the triac 14 is included. In parallel with the triac 14, is a variable resistor 64 used to protect the triac from excessively high reverse voltages. The control electrode 17 of the triac 14 is connected to the phase S. A line 67 is connected to the terminal marked UBS in FIG. 4 as an output of the filter and stabilizing circuit 50. The central conductor or neutral line MP of the three-phase system is again denoted by the reference numeral 48. The base of a transistor 68 is connected, through a resistor 69, to the phase S. At the same time, the base of the transistor 68 is coupled to the line 48 through a diode 70. The cathode of the diode 70 is, in this arrangement, directly joined to this base of the transistor 68. The emitter of this transistor is also connected to the line 48, whereas the collector of transistor 68 leads, through a resistor 71, to the line 67. A first time delay element is comprised from the series circuit of a capacitor 72 and resistor 73, which leads from the collector of the transistor 68 to the line 67. The base of a transistor 74 is connected to the junction of the capacitor 72 and resistor 73, whereas the emitter of this transistor 74 is also connected to the line 48. The collector of the transistor 74 leads to the line 67 through a resistor 75. The series circuit of a capacitor 76 and resistor 77, lies between the collector of the transistor 74 and the line 67, and forms a second delay network. The base of a further transistor 78 is connected to the junction between capacitor 76 and resistor 77, and the emitter of this transistor 78 is directly connected to the line 48. The collector of transistor 78, on the other hand, leads to the line 67 through a resistor 79. The cathode of a diode 80 is connected to the collector of the transistor 78, and the anode of diode 80 is directly connected to the line 48. Connected in parallel with the diode 80 is, furthermore, the series combination of a diode 82 and resistor 81. The diode 82 is directed so that the cathode is connected to the line 48. The base of a transistor 83 is connected to one terminal of the resistor 81 which has its other terminal joined to the anode of the diode 82. The base of transistor 83, furthermore, leads through a resistor 84, to the load side of the triac 14. From the collector of the transistor 83, a resistor 86 leads to the circuit junction 85 between a resistor 87 and a capacitor 88. The other terminals of this resistor 87 and capacitor 88 are connected together and to the line 67. The resistors 89, 90 and 91 form a voltage divider connected between the lines 48 and 67. The resistor 90 is an adjustable one with a sliding contact 96 which is connected to the emitter of the transistor 83. A capacitor 93 is, furthermore, connected between the emitter of transistor 83 and the line 48.

Figure 7:
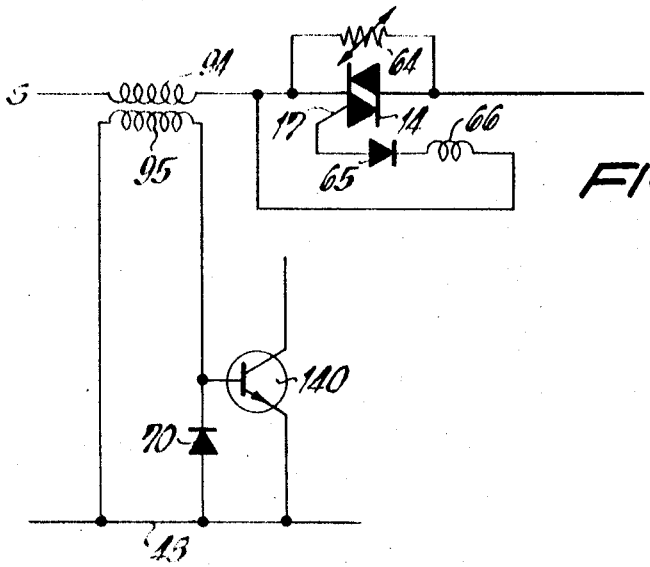

FIG. 7 shows a variation in the circuit arrangement of the sampling stage. The primary winding 94 of a current transformer is connected in series with the phase S. The secondary winding 95 has one terminal connected to the line 48, and its other terminal to the base of a transistor 140. The functional operation of the circuit of FIG. 6 will be described in conjunction with the diagrams shown in FIG. 10.

The voltage function shown in FIG. 10a appears in the phase S of the power supply network. Through the series circuit of the resistor 69 and diode 70, which lies between the phase S and the line 48, the sampling stage becomes controlled from the waveform in FIG. 10a corresponding to the phase voltage of the power supply network. The voltage appearing at the base of the transistor 68 to which the cathode of the diode 70 is connected, is represented in FIG. 10b. During the positive half-wave of the voltage in phase S, the diode 70 is cut-off, and the base-emitter path of the transistor 68 conducts. During the negative half-wave, on the other hand, the diode 70 conducts and the base-emitter path of the transistor 68 is cut-off or non-conducting. The voltage function appearing at the collector of the transistor 68 appears in FIG. 10c. During the positive half-wave of the voltage, its collector assumes substantially the potential of the circuit line 48, whereas the negative half-wave assumes substantially the potential of the circuit line 67. In FIG. 10d, the voltage function is shown at the base of the transistor 74. The negative voltage spikes at the colector of the transistor 68, produce negative voltage pulses from the capacitor 72 and resistor 73, the combination of which constitutes a time delay element. These negative voltage pulses from the time delay element cut-off or turn-off the transistor 74 for the duration of these pulses. The positive voltage spikes at the collector of the transistor 68 do not affect the transistor 74 when in the conducting state, through the resistor 73. Through the negative voltage pulse, the transistor 74 becomes turned off, as shown in FIG. 10e. The negative voltage spikes at the base of the transistor 74 produce the voltage function illustrated in FIG. 10f, at the second time delay element consisting of the capacitor 76 and the resistor 77. This voltage function is, consequently, also applied to the base of the transistor 78. The negative pulses arise here, similarly as at the base of the transistor 74. The transistor 78 is held in the conducting state through the resistor 77.

Through the negative voltage pulses which appear at the time delay element constituted of the capacitor 76 and the resistor 77, the transistor 78 is turned off for a period of time corresponding to the duration of these negative voltage pulses. When, now, the transistor 78 is turned off or cut-off, the series circuit consisting of the resistor 81 and the diode 82, is not bridged by the transistor. The resistors 84 and 81 form a voltage divider having a tap connected to the base of the transistor 83. At this base of the transistor 83 appears, thereby, the voltage function described in FIG. 10g. This voltage corresponds to the actual measured and prevailing voltage. If this measured voltage has a negative potential relative to the line MP, then this negative potential is conducted through the diode 80 and is not applied through the transistor 83 for switching this transistor to the conducting state. The transistors 78 and 83 become, thereby, not subjected to a negative measured voltage which is too high. With the aid of the voltage divider which consists of resistors 89, 90 and 91, the emitter of the transistor 83 has applied to it a fixed potential. The resistor 90 of this voltage divider has a movable or slidable tap 96.

As soon as the voltage at the base of the transistor 83 rises above this fixed potential, the transistor becomes conducting, and the capacitor 88 becomes charged through the resistor 86. Corresponding to the desired value which is to prevail, the proper voltage is set or applied through the tap 96 of the resistor 90. The voltage applied to the base of the transistor 83 corresponds to the actual prevailing value, as described above. At the terminal 85 leading to the junction of the parallel combination of the capacitor 88 and resistor 87, a voltage signal is attained which represents the difference between the actual prevailing value and the desired value. The resistor 87 connected in parallel with the capacitor 88 serves the purpose that the voltage prevailing at the terminal 85 can actually follow the difference between actual and desired values for a period of time determined by the time constant of the capacitor 88 in combination with the resistor 87.

The resistors 89 and 91 apply an adjustable desired value or input between the lowest and highest possible value within the region of this parameter. FIG. 7 shows a variation of the circuit arrangement for the sampling stage whereby the actually prevailing value or output is sampled. When using the arrangement of FIG. 6, the negative voltage pulses illustrated in FIG. 10b are realized when the voltage of phase S passes through zero. When using the arrangement of FIG. 7, this condition applies when the current in phase S goes through zero. The arrangement of FIG. 7 is more complex, but phase shifts which are possible between voltage and current, are here no longer critical. The actual prevailing value or output is always sampled in this embodiment, when no voltage is induced within the secondary winding of the current transformer, corresponding to the state when the applicable triac is turned off. The sampling region can, therefore, never fall within the conductive region of the triacs.

When very undesirable phase shift occurs between current and voltage with the arrangement of FIG. 6, it is conceivable that the semi-conductor switches are triggered or switched shortly before the current passes through zero. Such switching of the semi-conductor elements may be accomplished through switching or firing pulses. When the current passes through zero, the next or subsequent time, these switches are again turned off and remain, thereby, cut-off or turned off for the entire following half-wave. During this following half-wave, the switches were to have been conducting or turned on, corresponding to the operating state of the machine. This operating state can be avoided, in one case, by using an ignition or firing oscillator in place of a firing pulse. This condition can also be avoided by using the arrangement of FIG. 7 in conjunction with an adapted control logic which first fires the triac, when no voltage is induced any longer within the secondary winding of the transformer.

Figure 8:
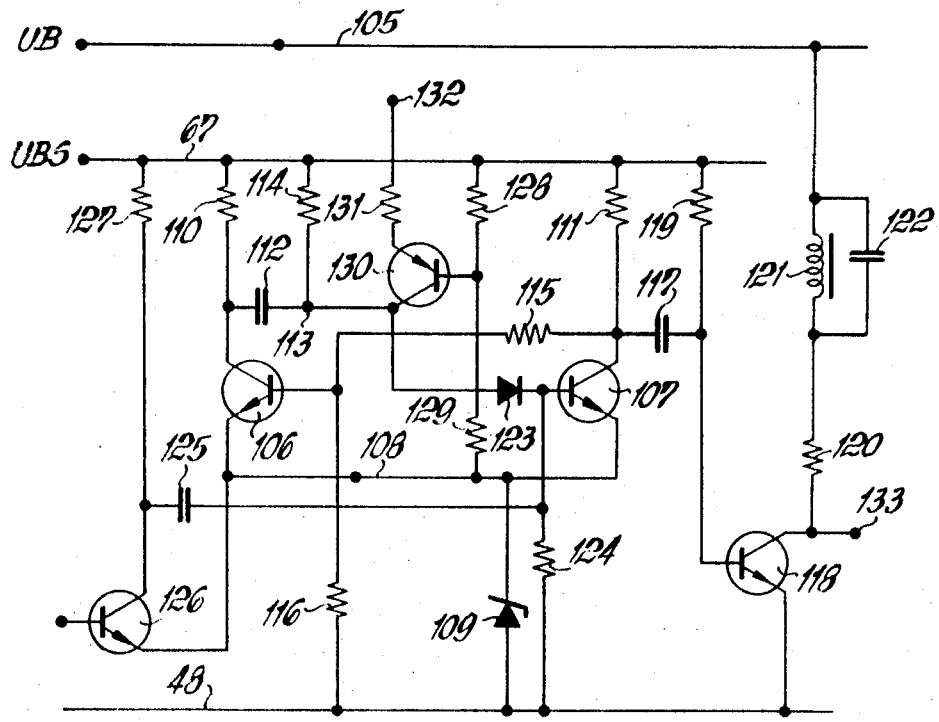
Figure 9:
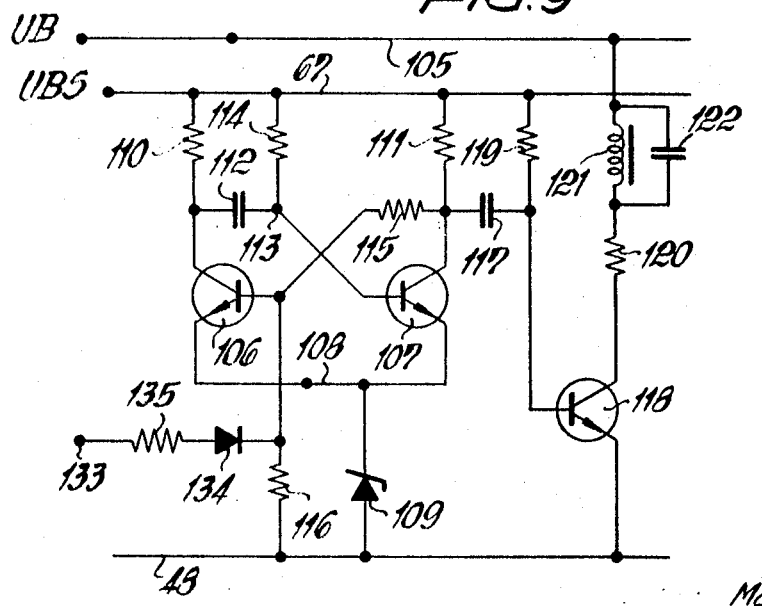

In the circuit diagrams of FIGS. 8 and 9, monostable multivibrator circuits are used for the time delay elements. FIG. 8 shows a basic or primary stage in which the delay time is variable. FIG. 9 shows a monostable multivibrator having a constant delay time. A supply line 105 prevails in addition to the line 67 connected to the supply UBS. The supply line 105 is connected to the terminal UB which is shown to be connected with the filter and stabilizing circuit 50 in FIG. 4. The primary stage or basic stage shown in FIG. 8, has two switching transistors 106 and 107 which are feedback coupled. The emitters of these transistors 106 and 107 are connected together through the line 108. This line 108 is further connected with the line 48, through a zener diode 109. The line 108 acquires a zener voltage corresponding to a zener diode in the form of a positive potential relative to the line 48. The collectors of the switching transistors 106 and 107 are interconnected through the resistors 110 and 111, respectively, with the line 67. A capacitor 112 is connected between the collector of the transistor 106 and the circuit junction 113 which, in turn, leads to the line 67 through a resistor 114. The collector of the transistor 107 is coupled to the base of the transistor 106 through the resistor 115, whereas the base of the transistor 106 is coupled to the line 48 through the resistor 116. The base of a driving transistor 118, furthermore, is coupled to the collector of the transistor 107, through a coupling capacitor 117. At the same time, the base of the transistor 118 is connected to the line 67, through a resistor 119. The emitter of the transistor 118 is connected directly to the line 48, whereas the collector of this transistor 118 leads to the line 105 through a series circuit consisting of a resistor 120 and the primary winding 121 of a firing transformer. A capacitor 122 is connected in parallel with this primary winding 121 of the firing transformer. The base of the switching transistor 107 is connected directly to the cathode of a diode 123. The anode of this diode 123 is, on the other hand, connected to the circuit junction 113. At the same time, the base of the transistor 107 leads to the line 48 through the resistor 124. A capacitor 125 is coupled, moreover, with this base of the transistor 107 and the collector of the transistor 126 having its emitter connected directly to the line 108. The collector of this transistor 126 leads, through a resistor 127, to the line 67. A voltage divider is applied between the line 67 and the line 108. This voltage divider consists of resistors 128 and 129. The base of a control transistor 130 is connected to the junction of these resistors 128 and 129, whereas the collector of this control transistor 130 is connected directly to the circuit junction 113. The emitter of transistor 130 leads to the terminal 132, through a resistor 131.

In operation of the circuit of FIG. 8, the terminal 132 is connected with the terminal 85 shown in the circuit arrangement of FIG. 6. The base of the transistor 126 is connected with the terminal 58 of the circuit shown in FIG. 4. The base of the transistor 126 has applied to it a voltage representing that prevailing between phase R and line MP. This voltage applied to the base of the transistor 126 is reduced through the aid of the transformer 42. This transistor 126 commences to conduct as soon as the voltage at its base is more positive than the voltage at its emitter. The emitter voltage of this transistor is fixed through the zener voltage of the zener diode 109. Through further rise or increase in the potential at the base of this transistor, the latter becomes saturated after a short time interval. From the switching of the transistor 126, only the alternating current portion corresponding to a negative pulse is applied to the base of the transistor 107, through the capacitor 125. This transistor 107 conducts while in its inoperative or quiescent state through the resistor 114. As a result of the applied pulse, this transistor is turned off. The switching transistor 106 becomes, thereby, turned on and this switching process takes place in a particularly short time interval, due to the support of the feedback coupling resulting from the interconnection of both of the emitters of the switching transistors 106 and 107. The voltage prevailing across the coupling capacitor 112 cannot vary or change within the short switching time, since the stored energy within a capacitor cannot vary suddenly or in a step-wise manner. Accordingly, a negative step voltage also appears at the circuit junction 113. The capacitor 112 becomes discharged through the resistors 110, 114 and through the control transistor 130. In this manner, the circuit junction 113 can again acquire positive potential. The duration of the discharge process is variable over wide limits, through the charging current portion which is delivered by the collector of the control transistor 130. The collector current of the control transistor 130 is, however, dependent upon the current flow in its emitter, since it is driven as a common base circuit. This current flow in the emitter corresponds to the difference between actual prevailing value or output and the desired value or input. Such current flow representing this difference is taken from the terminal 85 in the circuit of FIG. 6.

As soon as the circuit junction 113 has again become positive so that the diode 123 and the base-emitter path of the switching transistor 107 commence to conduct, the monostable multivibrator returns to its initial state. Through the voltage applied to the terminal 132 and is taken from the circuit junction or terminal 85 in FIG. 6, the time interval of the monostable multivibrator of the primary or fundamental stage, is variable over wide regions. The return switching or reset is transmitted in the form of a negative pulse to the base of the driving transistor 118 through the capacitor 117. This driving transistor 118 is turned off briefly thereupon, and as a result a brief current variation takes place within the primary winding 121 of the ignition transformer. Such variation in the current within the primary winding 121, induces an ignition or firing pulse within the secondary winding 66, not shown in that Figure. The capacitor 122 serves to dampen the switching process of the primary winding 121 of the firing transformer, and is, for this purpose, connected in parallel with the capacitor 122. If the fundamental stage or primary stage is still not reset to its initial state, before a new negative pulse is transmitted to the base of the switching transistor 107 through the collector of transistor 126 and capacitor 125, then a negative pulse shortly prior to that from the transistor 126 could switch the monostable multivibrator to its quasi stable state. Through the cut-off of the transistor 126, a positive pulse is generated and transmitted to the base of the transistor 107, so that the monostable multivibrator is forced into its stable state.

Through the circuitry of FIG. 8, the firing of the triac is accomplished through a single substantial pulse. It is also possible, however, to switch on, for example, an oscillator in the form of a blocking oscillator with the aid of control logic. In this manner, the triacs receive firing pulses during the entire period of time that they are to be conducting. Such a control logic switches, for example, the firing pulse generator when the monostable multivibrator has been returned to its initial state and the phase voltage or phase current has exceeded a predetermined value.

The circuit shown in FIG. 9, has a monostabel multivibrator with time interval which is not variable. Such a switching circuit serves as a time delay element of constant delay time which may be found in the control units 23 and 24 of FIG. 1 to 3. This circuit is very similar to the circuit of FIG. 8 in which the fundamental or primary stage is shown. All of the variable elements for the charging current of the capacitor 112, as well as the diode 123, have been omitted. The control results from synchronization of the supply network through the primary stage which actuates the driving transistor 118. The base of the switching transistor 106 leads to a terminal 133 through a diode 134 and resistor 135. This terminal 133 is connected to the collector of a driving transistor 118 which is, for example, the driving transistor of the primary or fundamental stage. Through the diode 134, only positive pulses are applied to the base of the switching transistor 106. In this manner, the transistor 106 can only receive a positive switching pulse upon resetting of the transistor 107 or when cutting off the driving transistor 118. Several such monostable multivibrators can be connected in series so that each return of a switching transistor 107, the following monostable multivibrator receives a positive switching pulse. In this case, the time interval of the monostable multivibrator, corresponds to the phase shift between the nodal points of two phase voltages of the supply network. If, however, all subsequent monostable multivibrators with constant time interval, are simultaneously controlled from the primary or fundamental stage, then all intervals of the monostable multivibrators may not all be identical. Instead, these intervals must be scaled or set so that their resetting corresponds in time to the prevailing phase shift between two phase voltages of the power supply network.

An advantageous regulating feature may be realized in the operation of the arrangement shown in the block diagram of FIG. 3 and presented in detail in the following Figures, when the sampling stage for the actual or prevailing value is first switched on after a predetermined time delay. Such delayed switching on of the sampling stage is to take place after actuating or turning on the entire arrangement through actuating the switch of the power supply network. This is, for example, realizable with a further RC delay element. In this manner, the regulator receives ahead of time a fictitious zero value for the actual or output value, during the duration of the time delay. Accordingly, the machine can operate with full power and pick-up speed.

In the example under consideration, a neutral line or central line was necessary from the alternating current network, for the purpose of having a reference potential for the output value. Such a central line or neutral conductor can be omitted when two triacs of two following phases or consecutive phases are simultaneously fired from one control unit. A return flow through a neutral or center conductor is then no longer necessary, since a closed circuit is formed between the two consecutive phases of the power supply network. Even when two triacs are simultaneously fired, an alternating field prevails at the load side.

For synchronizing and realizing a fixed reference point for the output potential, when the asynchronous machine is connected to an alternating current network without a central or neutral conductor, it is possible to provide a synchronizing arrangement for a Y-connected machine. Such a synchronizing arrangement is reproduced with the aid of secondary windings of transformers, and reproduces the alternating field of the power supply network. With this arrangement, the firing instants are applied to the voltages of the power supply network through the secondary alternating field of the regulator. Since in this case each phase of the network has already a secondary winding of a transformer, the control of the triacs may be carried out with firing pulses from conventional firing apparatus. The secondary windings of the transformer can be carried by a single core for all phases, or each phase can be arranged on a separate core or transformer. The advantage of the sampling stage with the design of the present invention, is also applicable to the preceding arrangement. In this case, in particular, it is desirable to provide separate control logic for each triac. The control logic switches on an oscillator generating a firing pulse relative to the phase voltage of the supply network with a predetermined phase shift from the regulator.

When a plurality of electrical machines operate in parallel from one system, the control electrodes of all semi-conducting switches may be connected in parallel. These semi-conducting switches are then associated with one phase of the supply network. In this manner, only one regulating circuit is required for the entire system of parallel operating machines.

It will be understood that each of the elements described above, or two or more together, may also find a useful application in other types of constructions differing from the types described above.

While the invention has been illustrated and described as embodied in an arrangement for controlling semi-conductor switches from two directions of current flow, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims.

We claim:

1. An arrangement for operating bidirectional, controlled, semi-conductor switches, comprising, in combination, a source of alternating current with at least two phases; load means for operation from said source of alternating current; a respective bidirectional, controlled, semi-conductor switch connected in each phase between said source and said load means; control means including a first control stage having a time delay element with variable time delay, said control means further including as many secondary control stages as there are phases minus one, each secondary control stage having a time delay element with fixed time delay, each secondary control stage being connected to receive signals at least indirectly from said first control stage, said first control stage and each said secondary control stage being connected to the control electrode of a respective said semi-conductor switch to control the conductivity of the latter, said first control stage and said secondary control stages being connected in series so that one secondary control stage receives a signal directly from said first control stage and each secondary control stage excepting said one secondary control stage receives a signal from that secondary control stage to which it is connected; and synchronizing means connected between said first control stage and the phase associated with the semi-conductor switch to which said first control stage is connected for determining when the latter will render conductive the semi-conductor switch connected to said first control stage, said first control stage comprising: monostable multivibrator means with two feedback coupled switching transistors having emitters connected together and alternately turned on and turned off, the output of said synchronizing means being connected with the base of a first one of said transistors, said first transistor being turned on in the quiescent state, first capacitor means connected between the collector of the second one of said two transistors and said first transistor, first resistor means connected between the collector of said first transistor and the base of said second transistor, Zener diode means for applying a fixed potential to the emitters of said two switching transistors, an auxiliary transistor with an emitter connected to the emitters of said switching transistors, the base of said auxiliary transistor being connected to said synchronizing means, and differentiating means connected between the collector of said auxiliary transistor and the base of said first switching transistor, said differentiating means comprising: second capacitor means connected between the collector of said auxiliary transistor and the base of said first transistor, and second resistor means connected to the junction of said second capacitor means and the base of said first transistor, said secondary control stage comprising: a third transistor and a fourth transistor with emitters connected together, third capacitor means connected between the collector of said third transistor and the base of said fourth transistor, third resistor means connected between the base of said third transistor and the collector of said fourth transistor, further Zener diode means connected to the emitters of said third and fourth transistors for applying a fixed potential to the emitters of said third and fourth transistors, said third and fourth transistors comprising monostable multivibrator means, and input diode means connected to the base of said third transistor for applying a signal to said monostable multivibrator means of said secondary stage comprised of said third and fourth transistors.

2. The arrangement as defined in claim 1 wherein said source of alternating current is a polyphase alternating current system.

3. The arrangement as defined in claim 1 wherein said first monostable multivibrator has a resistor-capacitor network for determining said time delay, the resistor of said network being a variable resistor.

4. The arrangement as defined in claim 1 wherein said first monostable multivibrator has a resistance-capacitance network for determining said time delay, said resistance of said resistance-capacitance network being a controlled transistor for providing variable resistance.

5. The arrangement as defined in claim 1, wherein each said semi-conductor switch is a triac.

6. The arrangement as defined in claim 1, wherein each said time delay element is a monostable multivibrator.

7. The arrangement as defined in claim 6, including a respective pulse generator in said first control stage and in each said secondary control stage for producing a firing pulse for the respective semi-conductor switch whenever the corresponding monostable multivibrator resets.

8. The arrangement as defined in claim 1, wherein said synchronizing means comprises transformer means connected to the phase associated with the semi-conductor switch to which said first control stage is connected; a full-wave rectifier connected to the secondary winding of said transformer means; and filter means connected in parallel with said full-wave rectifier for filtering only the upper wave portions of said source of alternating current.

9. The arrangement as defined in claim 8 including threshold amplifying means in said synchronizing means for applying a signal to said first control stage when a predetermined threshold voltage is exceeded.

10. The arrangement as defined in claim 1, wherein said load means is electric machine means, and further including sampling means having time delay means, control input means, sampling input means, and output means, said control input means being connected to the source side of at least one said semi-conductor switch for controlling when the time delay of said time delay means begins, said sampling input means being connected to the load side of said at least one semi-conductor switch for sampling the voltage at the load side primarily while said at least one semi-conductor switch is non-conductive; a desired value generator; a regulator connected to receive as input the output of said desired value generator and of said sampling means for providing as an electric signal output a set parameter for shifting in time, in dependence on the difference between the sampled voltage and the output of said desired value generator, when the semi-conductor switches are turned on, said first control stage being connected to receive as input the electric signal output of said regulator.

11. The arrangement as defined in claim 10, including voltage dividing means connected to the phase associated with said at least one semi-conductor switch, said sampling input means being connected to a tap of said voltage dividing means.

12. The arrangement as defined in claim 10, including current transformer means with output connected to said control input means of said sampling means, said transformer means being connected in the phase of said source between said source and said at least one semi-conductor switch.

13. The arrangement as defined in claim 12, including diode means connected in parallel with said control input means.

14. The arrangement as defined in claim 10, wherein said time delay means includes a first delay element for determining when the sampling by said sampling means begins and a second time delay element for determining the length of the time interval over which sampling occurs.

15. The arrangement as defined in claim 14, further including a third delay element in said time delay means for varying the instant of sampling by said sampling means.

16. The arrangement as defined in claim 1, wherein said source of alternating current is a polyphase source with neutral conductor, said load means being a polyphase load with neutral conductor connected to the neutral conductor of said source, said semi-conductor switches being operated in cyclical sequence corresponding to the phases of said source of alternating current.

17. The arrangement as defined in claim 1, wherein each secondary control stage is directly connected to said first control stage.

* * * * *